United States Patent [19]

Vinatieri

[11] 4,239,628

[45] Dec. 16, 1980

[54] OPTIMIZING COSURFACTANT IN MICROEMULSION FOR SPECIFIC OIL

[75] Inventor: James E. Vinatieri, Bartlesville, Okla.

[73] Assignee: Phillips Petroleum Company, Bartlesville, Okla.

[21] Appl. No.: 894,878

[22] Filed: Apr. 10, 1978

[51] Int. Cl.$^3$ .............................................. C09K 3/00
[52] U.S. Cl. .............................. 252/8.55 D; 166/252; 166/273; 166/274
[58] Field of Search ................. 252/8.55 D; 166/273, 166/274, 275, 252, 272

[56] References Cited

U.S. PATENT DOCUMENTS

| | | | |
|---|---|---|---|
| 3,885,628 | 5/1975 | Reed et al. | 166/252 |
| 3,938,591 | 2/1976 | Ossip et al. | 166/252 X |
| 3,981,361 | 9/1976 | Healy | 166/252 |
| 4,079,785 | 3/1978 | Hessert et al. | 252/8.55 D |
| 4,125,156 | 11/1978 | Glinsmann | 252/8.55 D |

*Primary Examiner*—Benjamin R. Padgett
*Assistant Examiner*—J. L. Barr

[57] ABSTRACT

In one aspect of the invention a surfactant system comprising water, electrolyte, a surfactant, and a cosurfactant, the system is optimized by equilibrating a series of surfactant systems having different cosurfactants, with oil corresponding to that in the reservoir to be produced and selecting a system having the desired distribution of the cosurfactant into both the oil and the aqueous phases. Preferably, the cosurfactant migrates into the oil phase such that it is present in the upper oil phase and lower aqueous phase in approximately equal amounts. In another aspect, oil is recovered using a surfactant system having a distribution coefficient within the range of 0.6 to 1.5, preferably 0.8 to 1.2, most preferably about 1.

9 Claims, No Drawings

OPTIMIZING COSURFACTANT IN MICROEMULSION FOR SPECIFIC OIL

BACKGROUND OF THE INVENTION

It is known in the art to form a surfactant system using a petroleum sulfonate, brine, and a cosurfactant, such as an alcohol. It is known that the cosurfactant should be a material having moderate solubility in water and excellent surfactant systems can be made using a cosurfactant with a solubility in water within the range of 0.5 to 20 grams per 100 grams of water. However, a cosurfactant having what would otherwise appear to be ideal solubility characteristics, may in fact not be optimum for a given type of oil.

SUMMARY OF THE INVENTION

It is an object of this invention to tailor a surfactant system to a specific oil based on cosurfactant distribution coefficients;

It is a further object of this invention to optimize a cosurfactant relative to a particular oil to be displaced and relative to other ingredients in the surfactant system; and It is yet a further object of this invention to increase the effectiveness of tertiary oil recovery systems involving the use of microemulsions.

According to one aspect of this invention, a series of surfactant systems comprising water, electrolyte, surfactant and cosurfactant are equilibrated with oil corresponding to that to be produced, with cosurfactants of varying solubility being used so as to determine the cosurfactant which will give the desired distribution into the oil and water phase. According to another aspect of the invention, oil is recovered using a surfactant system having a distribution coefficient within the range of 0.6 to 1.5.

DESCRIPTION OF THE PREFERRED EMBODIMENTS

By distribution coefficient as used herein, is meant the numerical ratio of the concentration of cosurfactant in the upper oil phase divided by the concentration of cosurfactant in the lower aqueous phase, after mixing oil and surfactant and allowing time for separation into three phases, the predominantly oil upper phase, the predominantly aqueous lower phase and a microemulsion middle phase.

Systems having a distribution coefficient within the range of 0.3 to 3 and even systems outside of this range are highly effective in tertiary oil recovery operations. However, in accordance with this invention any given system can be improved by varying the cosurfactant so that the distribution coefficient is nearer to 1. The preferred systems are those in which the distribution coefficient is within the range of 0.6 to 1.5, preferably 0.8 to 1.2, most preferably about 1.

As a first step in utilizing this invention, surfactant systems utilizing brine, a surfactant and a cosurfactant having a solubility within the range of 0.5 to 20 grams per 100 grams of water can be equilibrated with oil to be produced until a good surfactant system for tertiary oil recovery is produced as evidenced by the formation of three phases. This can be accomplished by varying the equivalent weight of the sulfonate, the concentration of the brine, and/or the solubility of the cosurfactant as disclosed in Hessert et al, U.S. Pat. No. 4,079,785, the disclosure of which is hereby incorporated by reference. Thereafter, the system can be further optimized in accordance with this invention by varying the cosurfactant until a more nearly equal distribution of the cosurfactant into the oil and aqueous phases is obtained. This can be very rapidly done since it is readily apparent that if the initial system has a relatively high concentration of the cosurfactant in the water phase, a less water soluble cosurfactant should be used and vice versa.

A preferred surfactant to be used in accordance with this invention is a petroleum sulfonate having an average equivalent weight within the range of 375 to 500, preferably 400 to 425. The surfactant is used in an amount within the range of 3 to 12, preferably 4 to 8 weight percent based on the weight of the water.

The cosurfactant can be any alcohol, amide, amine, ester, aldehyde or ketone containing 1 to 20 carbon atoms and having a solubility in water within the range of 0.5 to 20, preferably 2 to 10 grams per 100 grams of water. Preferred materials are $C_4$ to $C_7$ alkanols or mixtures thereof, however, the critical factor as noted hereinabove is the actual distribution of cosurfactant into the oil and aqueous phases, the above description of the cosurfactants simply being indicative of likely starting materials. The cosurfactant is utilized in an amount within the range of $\frac{1}{2}$ to 12, preferably 2 to 6 weight percent based on the weight of the water.

The brine constitutes 85 to 95 weight percent of the total composition including brine, surfactant and cosurfactant. The brine is made up of water and an electrolyte which is generally predominantly sodium chloride. The electrolyte is present in the water in an amount within the range of 250 to 100,000, preferably 2,000 to 50,000 parts per million total dissolved solids (TDS). Large amounts of divalent ions are generally undesirable.

The surfactant system to be contacted with the crude oil should be stable, that is, they should be homogeneous and preferably clear solutions. Such stability is desirable for convenience in storage and handling and stability at the formation temperature is particularly desirable.

About 1-3 parts, generally about 1 part, of surfactant solution and about 1 part of crude oil by weight are equilibrated by any suitable means such as vigorous shaking, vigorous stirring, and the like. The crude oil should be representative of the formation crude into which the surfactant system will be injected. However, for convenience, the gaseous or easily volatilizable components of the crude which might interfere with the small scale equilibrating step, may have been removed. The temperature of the equilibration should approximate the temperature of the formation or at least should be taken into account.

The resulting equilibrated mixture is then allowed to stand undisturbed for about 6 to 24 hours (or less if partitioning occurs sooner) to determine its partitioning effectiveness, i.e., separation into three phases. The temperature of the mixture during this period should also preferably approximate the temperature of the formation to be treated.

In practice, the partitioning surfactant solutions will separate into a lower aqueous phase which is predominantly brine and which contains some of the cosurfactant but very little of the petroleum sulfonate surfactant. This phase is in contact with a middle oil-rich and surfactant-rich microemulsion phase. The microemulsion phase generally contains substantial amounts of oil and brine with some cosurfactant. Almost all of the petroleum sulfonate surfactant will have migrated into this oil-rich microemulsion phase. The upper oil phase is almost completely oil with a very minor amount of the ingredients of the original surfactant solution except that it preferably contains about the same percentage of cosurfactant as is contained in the lower aqueous phase as set out above.

It has been found that surfactant systems optimized in accordance with this invention give rise to a microemulsion phase which can be diluted with relatively larger amounts of either oil or water before phase separation occurs. That is, if the upper oil phase is decanted off from the microemulsion phase and then the microemulsion phase is decanted off from the lower aqueous phase so as to separate the microemulsion phase as a discreet entity, the microemulsion phase from the surfactant systems optimized in accordance with this invention can be diluted with substantial amounts of either oil or water and remain as a microemulsion whereas systems not so optimized, quickly undergo phase separation. The ability to be dilutable with larger amounts of oil or water is associated with higher tertiary oil recovery because the microemulsion remains intact a longer period of time in the formation.

The surfactant system optimized in accordance with this invention is then injected into an injection well or wells in a manner known in the art in water-flooding operations. On contacting of the oil in the formation, a three-phase bank is formed in situ comprising (1) a leading phase of said reservoir oil containing a small amount of said cosurfactant, a middle microemulsion phase comprising (a) oil from said reservoir and (b) water, surfactant, and cosurfactant from said injected surfactant system, said surfactant being of substantially higher concentration in said middle phase than in said injected surfactant system and (2) a trailing phase comprising the majority of said water from said injected surfactant system, a portion of said cosurfactant from said injected surfactant system and a minor portion of said surfactant from said injected surfactant system. In the actual formation, the variations in structure are such that the middle and trailing phases do not necessarily remain in the middle and end, respectively, in all places at all times but rather the multiple phases may manifest themselves on a microscopic level, i.e., within the individual pores or small structures.

A mobility buffer is generally injected behind the surfactant system. Examples of useful mobility buffers include aqueous and nonaqueous fluids containing mobility-reducing agents such as high molecular weight partially hydrolyzed polyacrylamides, polysaccharides, water soluble cellulose ethers, and the like.

Finally, a drive fluid is injected behind the mobility buffer to force oil contained in the reservoir toward a recovery well where it is produced. The drive material can be aqueous or nonaqueous and can be liquid, gas or a combination of the two. Generally, it is formation water or water similar thereto.

Additional details concerning the in situ generation of microemulsions for tertiary oil recovery are set out in U.S. Pat. No. 4,079,785 referred to above.

Thus, in the invention systems, the middle microemulsion phase exhibits an enhanced integrity toward the destabilizing effects of dilution by relatively large amounts of water and/or oil.

The following example demonstrates the increased dilutability exhibited by microemulsions prepared in accordance with the present invention.

EXAMPLE I

A 49.2 g portion of an aqueous saline solution containing 1.4 weight percent sodium chloride (14,000 ppm) was mixed with 30.8 g of a stock solution prepared by mixing 3 g 3-pentanol, 3 g of petroleum sulfonates having an equivalent weight of about 420, sold under the tradename Witco TRS 10-410, and 51.75 g of dodecane. After equilibration, the three-phase system consisted of a top oil phase, a middle microemulsion phase, and a bottom water phase. Analysis of the top phase and the bottom phase for 3-pentanol gave a distribution coefficient of about 1.06 which indicated that the concentration of 3-pentanol was about the same in the top oil phase as in the bottom water phase. The middle microemulsion phase was found to be dilutable with either 8 volume percent of additional dodecane or 8 volume percent of additional 1.4 weight percent sodium chloride solution before phase separation. In contrast, a similar microemulsion using the same sulfonate formulated with isobutyl alcohol cosurfactant (distribution coefficient of 0.22) was only dilutable with either 4 volume percent of additional dodecane or 4 volume percent of additional 1.6 weight percent sodium chloride solution before phase separation. The foregoing results indicate that alcohols having distribution coefficients nearer to 1 than that of an initial trial run yield microemulsions with greater tolerance to dilution by either additional brine or additional oil. In both instances the salinity was selected so as to be a value near the center of the salt range which yields three-phase partitioning, which for 3-pentanol was 1.4 weight percent and for isobutyl alcohol was 1.6 weight percent. It is believed this is necessary to give a fair comparison of results.

The present process is useful in the formulation of aqueous saline surfactant systems for tertiary oil recovery. The present process can be used for selecting the best cosurfactant for a system of water, electrolyte, surfactant, and cosurfactant for post-primary oil recovery. For a given combination of water-electrolyte-surfactant-cosurfactant, and oil, various cosurfactants are screened to find those candidates which on equilibration of said mixtures distribute to approximately the same extent into the top oil phase and bottom water phase in three-phase systems, i.e., those cosurfactants with distribution coefficients nearest to about 1.0. Cosurfactants are readily screened by equilibrating water-electrolyte-surfactant-cosurfactant-oil mixtures to give three-phase systems and analyzing the top oil phase and bottom water phase for the candidate alcohol cosurfactants. It is contemplated that the present process can be used to screen cosurfactants other than alcohols such as ethers, ketones, aldehydes, phenols, esters, amines, amides, ethoxylated alcohols, and the like. The screening procedure can be carried out at any electrolyte level which yields a three-phase system. Thus, it is not necessary to establish "the optimal salinity" level before screening the cosurfactant candidates. Deterioration of the microemulsion due to dilution with oil and/or water can be averted or postponed by selecting the cosurfactant in accordance with the present process.

Analysis of the three phases for percentage of water, electrolyte, surfactant and cosurfactant can be done by any conventional means. Actual analysis of the components of such systems have been carried out as follows. The oil, isobutyl alcohol and water were determined by gas chromatography. The electrolyte was determined by neutron activation and the sulfonate by an adaptation of ASTM D-1681-62 using Hyamine 1622 methylene blue titration.

While this invention has been described in detail for the purpose of illustration, it is not to be construed as limited thereby but is intended to cover all changes and modifications within the spirit and scope thereof.

I claim:

1. A process for preparing an aqueous surfactant system comprising:
   (a) preparing a surfactant system comprising brine, a petroleum sulfonate, and a cosurfactant having a solubility in water within the range of 0.5 to 20 grams per 100 grams of water;
   (b) mixing the resulting surfactant system with oil corresponding to that to be produced, allowing the system to equilibrate and form three phases, an upper predominantly oil phase, a middle microemulsion phase, and a lower predominantly aqueous phase;
   (c) analyzing the upper and lower phases for cosurfactant content; and
   (d) preparing a new surfactant system utilizing a cosurfactant of differing solubility from that of (a) so as to give a system which on equilibration with oil will result in the distribution of the cosurfactant more nearly equally into said upper and lower phases.

2. A method according to claim 1 wherein said cosurfactant of (d) is chosen such that the distribution coefficient is within the range of 0.8 to 1.2.

3. A method according to claim 2 wherein said distribution coefficient is about 1 and wherein said cosurfactant of (d) is an alcohol, said mixing step of (b) being carried out with a 1:1 ratio of oil to surfactant system.

4. A method according to claim 2 wherein said petroleum sulfonate has an average equivalent weight within the range of 375 to 500 and wherein said brine is water containing predominantly sodium chloride in an amount within the range of 2,000 to 50,000 parts per million.

5. A process for recovering oil from a subterranean oil bearing reservoir comprising: injecting into said reservoir through at least one injection well an aqueous surfactant system comprising brine, petroleum sulfonate surfactant and cosurfactant, said cosurfactant having a solubility in water within the range of 0.5 to 20 grams per 100 grams of water, said surfactant system characterized in that on contact with a substantially equal volume of oil corresponding to that in said reservoir, said surfactant system forms three phases, a predominantly oil phase, a predominantly aqueous phase, and a surfactant-rich microemulsion phase, and wherein said cosurfactant has a distribution coefficient between said oil and aqueous phase adjusted to a value within the range of 0.6 to 1.5 by mixing an initial surfactant system with oil corresponding to that to be produced, allowing the system to equilibrate and form three phases, an upper predominantly oil phase, a middle microemulsion phase, and a lower predominantly aqueous phase, analyzing the upper and lower phases for cosurfactant content and preparing said thus-adjusted system using a cosurfactant of differing solubility from that in said initial surfactant system so as to give a system which on equilibration with oil will result in the distribution of the cosurfactant more nearly equally into said upper and lower phases; forcing said oil toward at least one recovery well; and recovering said oil.

6. A method according to claim 5 wherein said distribution coefficient is about 1.

7. A method according to claim 5 wherein said distribution coefficient is within the range of 0.8 to 1.2.

8. A method according to claim 7 wherein said sulfonate has an average equivalent weight within the range of 375 to 500 and wherein said brine is comprised predominantly of water and 2,000 to 50,000 ppm sodium chloride.

9. A method according to claim 8 wherein said cosurfactant is an alcohol.

* * * * *